United States Patent
Tanaka et al.

(10) Patent No.: US 12,481,179 B2
(45) Date of Patent: Nov. 25, 2025

(54) VEHICLE DIMMER CONTROL SYSTEM

(71) Applicant: Yazaki Corporation, Tokyo (JP)

(72) Inventors: Moyu Tanaka, Shizuoka (JP);
Terumitsu Sugimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 1169 days.

(21) Appl. No.: 17/375,312

(22) Filed: Jul. 14, 2021

(65) Prior Publication Data

US 2022/0019095 A1   Jan. 20, 2022

(30) Foreign Application Priority Data

Jul. 16, 2020  (JP) ................................. 2020-121887

(51) Int. Cl.
| G02F 1/01 | (2006.01) |
| B60J 3/04 | (2006.01) |
| B60J 1/08 | (2006.01) |

(52) U.S. Cl.
CPC .............. G02F 1/0121 (2013.01); B60J 3/04 (2013.01); B60J 1/08 (2013.01)

(58) Field of Classification Search
CPC . G02F 1/0121; G02F 1/163; B60J 3/04; B60J 1/08; B60J 1/18; B60J 1/02; B60J 7/043
See application file for complete search history.

(56) References Cited

U.S. PATENT DOCUMENTS

| 8,380,393 | B1 * | 2/2013 | Ohtomo | B64C 1/1484 |
| | | | | 250/221 |
| 8,781,676 | B2 * | 7/2014 | McIntyre, Jr. | G02F 1/163 |
| | | | | 296/211 |
| 2019/0346701 | A1 * | 11/2019 | Lam | B60J 3/04 |
| 2020/0019034 | A1 * | 1/2020 | Lagowski | B60J 3/04 |

FOREIGN PATENT DOCUMENTS

| CN | 109177870 | B | * | 9/2020 | ............... B60Q 3/74 |
| DE | 102019133474 | A1 | * | 4/2021 | |
| EP | 3647116 | A1 | | 5/2020 | |
| GB | 2448041 | A | * | 10/2008 | ............... B60J 3/04 |
| JP | 2000-199382 | A | | 7/2000 | |
| JP | 2005-7920 | A | | 1/2005 | |
| JP | 2018-130981 | A | | 8/2018 | |
| JP | 2020-084432 | A | | 6/2020 | |
| WO | 2017/016777 | A1 | | 2/2017 | |

* cited by examiner

*Primary Examiner* — Faris S Almatrahi
(74) *Attorney, Agent, or Firm* — Sughrue Mion, PLLC

(57) ABSTRACT

A vehicle dimmer control system includes a controller that adjusts the visible light transmissivity of dimming glass in each of multiple windows included in a vehicle. The controller uses dimming determination information, which is at least one of own vehicle state information indicating a state of the vehicle and own vehicle position information indicating a vehicle position, to determine whether to bring the windows into a permeable or impermeable state. Based on this dimming determination information, the controller selects a control target window from among the plurality of windows and controls the dimming glass of that window to be in the permeable state or the impermeable state.

16 Claims, 5 Drawing Sheets

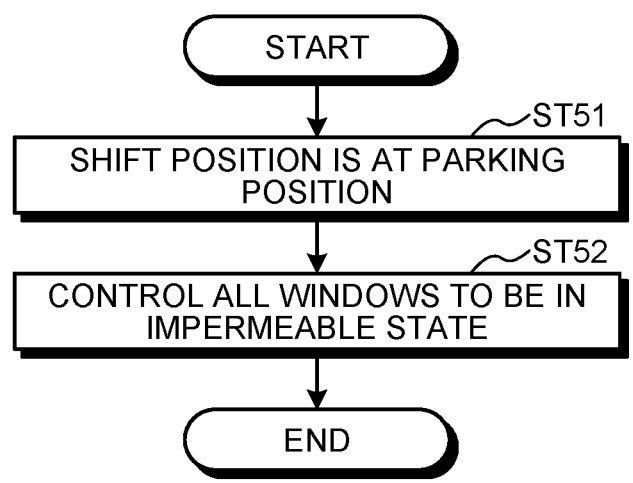

VEHICLE DIMMER CONTROL SYSTEM

CROSS-REFERENCE TO RELATED APPLICATION(S)

The present application claims priority to and incorporates by reference the entire contents of Japanese Patent Application No. 2020-121887 filed in Japan on Jul. 16, 2020.

BACKGROUND OF THE INVENTION

1. Field of the Invention

The present invention relates to a vehicle dimmer control system.

2. Description of the Related Art

Some vehicles such as automobiles have been conventionally provided with various devices aimed at protecting the privacy of the inside of a vehicle compartment. For example, Japanese Patent Application Laid-open No. 2020-084432 discloses a shade device that includes a windable sheet-like shade, and enshrouds a window provided between the inside of a vehicle compartment and a vehicle exterior, from the inside of the vehicle compartment by gradually lifting the shade from a wound state while spreading the shade by the drive force of a rotary machine.

Meanwhile, because the shade device spreads or winds the shade by the drive force of the rotary machine, it takes time for the shade to be brought into a spread state or the wound state. Thus, in the vehicle, the privacy of the inside of the vehicle compartment cannot be ensured until the spreading of the shade ends. In addition, even in a case where an occupant desires to immediately check the situation of the vehicle exterior from the inside of the vehicle compartment, such as the time of unloading, the occupant needs to wait until the winding of the shade ends. In short, in the conventional vehicle, it takes time for switching between the protection of privacy and the cancel of the protected state. When the perspective is broadened to include the field of windows, in this technical field, there has been known a technique that uses dimming glass that can promptly execute switching between a permeable state and an impermeable state using an electrical signal (For example, Japanese Patent Application Laid-open No. 2000-199382).

SUMMARY OF THE INVENTION

In view of the foregoing, the present invention aims to provide a vehicle dimmer control system that can make privacy protection of the inside of the vehicle compartment prompt.

In order to achieve the above mentioned object, a vehicle dimmer control system according to one aspect of the present invention includes a controller configured to control visible light transmissivity of dimming glass for each of windows, based on dimming determination information of a vehicle for determining whether to bring the windows disposed at a plurality of points of the vehicle and each includes dimming glass changed in visible light transmissivity based on an electrical signal, into a permeable state or an impermeable state, wherein the dimming determination information is at least one of own vehicle state information indicating a state of an own vehicle, and own vehicle position information indicating an own vehicle position, and the controller determines a control target window to be changed in visible light transmissivity, from among the plurality of windows based on the dimming determination information, and controls visible light transmissivity of dimming glass of the control target window to be in the permeable state or the impermeable state.

According to another aspect of the present invention, in the vehicle dimmer control system, it is preferable that in a case where vehicle speed information serving as the own vehicle state information indicates that the vehicle is moving, the controller controls visible light transmissivity of dimming glass of all the windows of a front seat to be in the permeable state.

According to still another aspect of the present invention, in the vehicle dimmer control system, it is preferable that in a case where the own vehicle position information indicates that the vehicle is moving on a residential street, the controller determines all the remaining windows other than all the windows of the front seat to be the control target windows, and if the control target windows are in the permeable state, the controller controls visible light transmissivity of dimming glass of the control target windows to be in the impermeable state.

According to still another aspect of the present invention, in the vehicle dimmer control system, it is preferable that in a case where vehicle speed information serving as the own vehicle state information indicates that the vehicle is slowly moving at a speed equal to or lower than a predetermined vehicle speed, the controller determines all the remaining windows other than all the windows of the front seat to be the control target windows, and if the control target windows are in the permeable state, the controller controls visible light transmissivity of dimming glass of the control target windows to be in the impermeable state.

According to still another aspect of the present invention, in the vehicle dimmer control system, it is preferable that in a case where vehicle interior illumination device information serving as the own vehicle state information has switched from a turned-off state to a turned-on state, the controller determines all the remaining windows other than all the windows of the front seat to be the control target windows, and if the control target windows are in the permeable state, the controller controls visible light transmissivity of dimming glass of the control target windows to be in the impermeable state, and in a case where vehicle interior illumination device information serving as the own vehicle state information has switched from the turned-on state to the turned-off state, the controller determines all the remaining windows other than all the windows of the front seat to be the control target windows, and controls visible light transmissivity of dimming glass of the control target windows to be in the permeable state.

According to still another aspect of the present invention, in the vehicle dimmer control system, it is preferable that in a case where headlight information serving as the own vehicle state information indicates a turned-on state, the controller determines all the remaining windows other than all the windows of the front seat to be the control target windows, and if the control target windows are in the permeable state, the controller controls visible light transmissivity of dimming glass of the control target windows to be in the impermeable state, and in a case where headlight information serving as the own vehicle state information indicates a turned-off state after the control, the controller determines all the remaining windows other than all the windows of the front seat to be the control target windows, and controls visible light transmissivity of dimming glass of the control target windows to be in the permeable state.

According to still another aspect of the present invention, in the vehicle dimmer control system, it is preferable that in a case where door open/close information serving as the own vehicle state information of at least one of all doors indicates an open operation, or in a case where door open/close command information serving as the own vehicle state information of at least one of all doors indicates an open command, the controller determines a window of a door corresponding to the open operation or the open command to be the control target window, and if the control target window is in the impermeable state, the controller controls visible light transmissivity of dimming glass of the control target window to be in the permeable state, and in a case where the door open/close information of a door serving as a target of the control indicates a closed state, or in a case where the door open/close command information of a door serving as a target of the control indicates a close command, the controller controls visible light transmissivity of dimming glass of a window of a door corresponding to the closed state or the closed command to be in the impermeable state.

According to still another aspect of the present invention, in the vehicle dimmer control system, it is preferable that in a case where shift position information of a transmission serving as the own vehicle state information indicates a shift position of a backward driving position, the controller controls visible light transmissivity of dimming glass of all the windows to be in the permeable state, irrespective of whether all the windows are in the permeable state or the impermeable state.

According to still another aspect of the present invention, in the vehicle dimmer control system, it is preferable that in a case where shift position information of a transmission serving as the own vehicle state information indicates a shift position of a parking position, the controller controls visible light transmissivity of dimming glass of all the windows to be in the impermeable state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart illustrating an example of control.

DETAILED DESCRIPTION OF THE PREFERRED EMBODIMENTS

An embodiment of a vehicle dimmer control system according to the present invention will be described in detail below based on the drawings. In addition, the present invention is not limited by the embodiment.

Embodiment

One of vehicle dimmer control systems according to the present invention will be described based on FIGS. 1 to 8.

Figure 1:
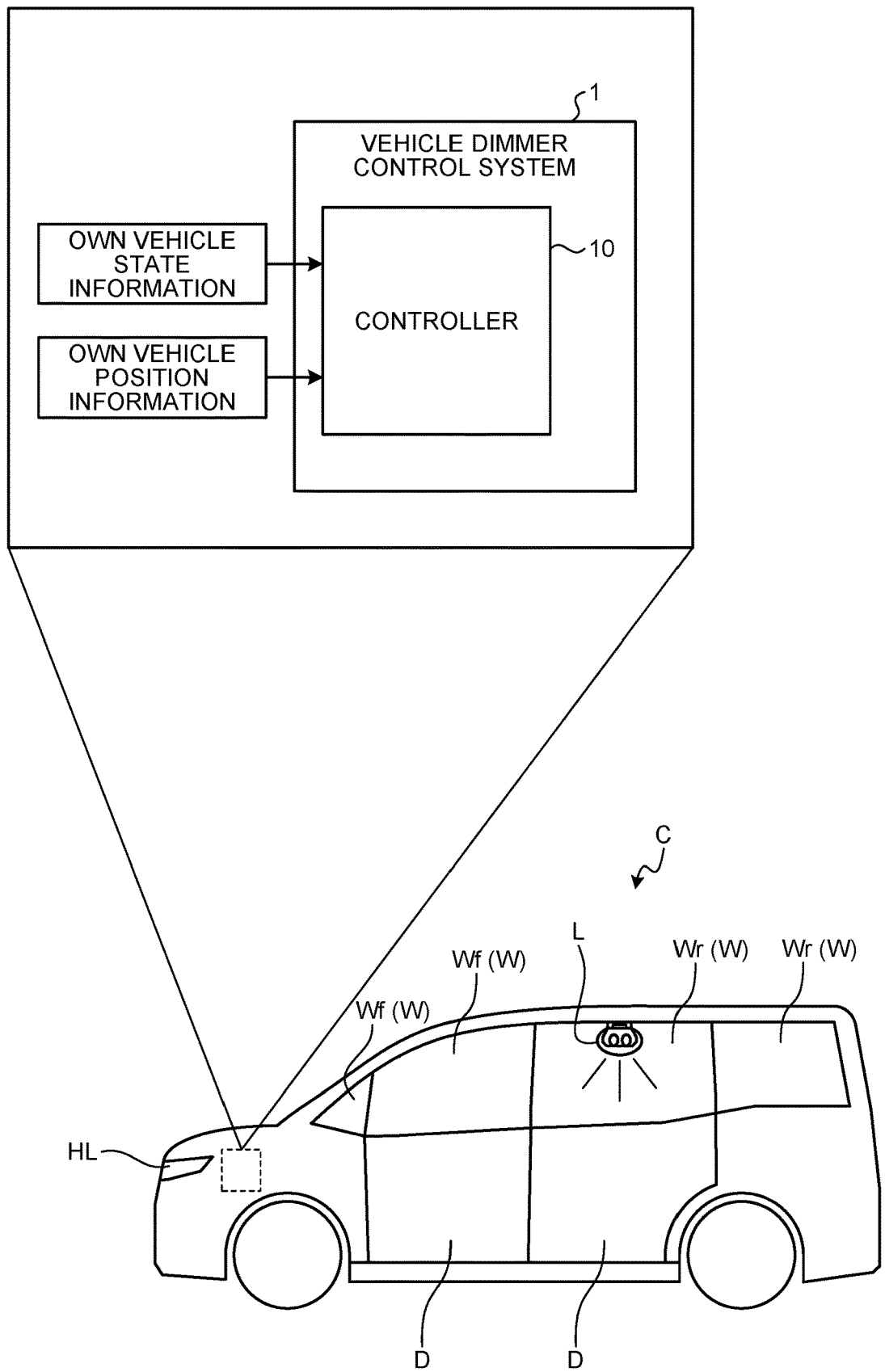
FIG. 1 is a block diagram illustrating a vehicle dimmer control system according to an embodiment.

FIG. 1 illustrates a vehicle dimmer control system 1 according to the present embodiment. The vehicle dimmer control system 1 is a control system for controlling windows W disposed at a plurality of points of a vehicle C, to be in a permeable state or an impermeable state, and performs control based on dimming determination information of the vehicle for determining whether to bring the windows W into the permeable state or the impermeable state. The vehicle dimmer control system 1 at least includes a controller 10 that performs the control.

The windows W is formed of dimming glass changed in visible light transmissivity based on an electrical signal, for controlling the windows to be in the permeable state or the impermeable state. The windows W illustrated here include not only windows for separating the inside of the vehicle compartment and the vehicle exterior, but also partitions for separating a front seat and a rear seat inside the vehicle compartment. The windows W for separating the inside of the vehicle compartment and the vehicle exterior refer to windows Wf on the front seat side (front window, left and right front side windows, front quarter window), windows Wr on the rear seat side {rear windows (including backdoor glass of a vehicle with a backdoor), left and right rear side windows (rear side window of each line in a case where there are a plurality of lines of rear seats), rear quarter window}, and a window (not illustrated) of a roof such as a sunroof. In addition, the partition may be a partition fixed between the front seat and the rear seat, or may be a partition vertically movable between the front seat and the rear seat. Note that the vertically-movable partition is assumed to be a target of control only when the partition ends moving upward. In addition, when the partition moves downward and is accommodated, the partition may be a target of control or may be excluded from a target of control.

The dimming determination information refers to at least one of own vehicle state information indicating the state of the own vehicle, and own vehicle position information indicating an own vehicle position. The own vehicle state information refers to, for example, vehicle speed information, shift position information of a transmission, vehicle interior illumination device information, door open/close information, door open/close command information, and the like. The vehicle dimmer control system 1 may be a control system including a detection device such as a sensor necessary for detection of the own vehicle state information, may be a control system that causes the controller 10 to directly receive detection information from the detection device, or may be a control system that causes the controller 10 to indirectly receive the detection information from another controller such as a main electronic control unit (ECU). For example, own vehicle position information of a car navigation system can be used as the own vehicle position information. The own vehicle position information is received by the controller 10 from the car navigation system.

The vehicle dimmer control system 1 illustrated here includes the controller 10, and the controller 10 controls visible light transmissivity of dimming glass for each of the windows W of the vehicle C using at least one of own vehicle state information received from another controller and own vehicle position information received from the car navigation system.

The controller 10 determines a control target window to be changed in visible light transmissivity, from among the plurality of windows W based on the dimming determination information, and controls visible light transmissivity of dimming glass of the control target window to be in the permeable state or the impermeable state. Hereinafter, various examples of the control will be described.

Example 1

Figure 2:
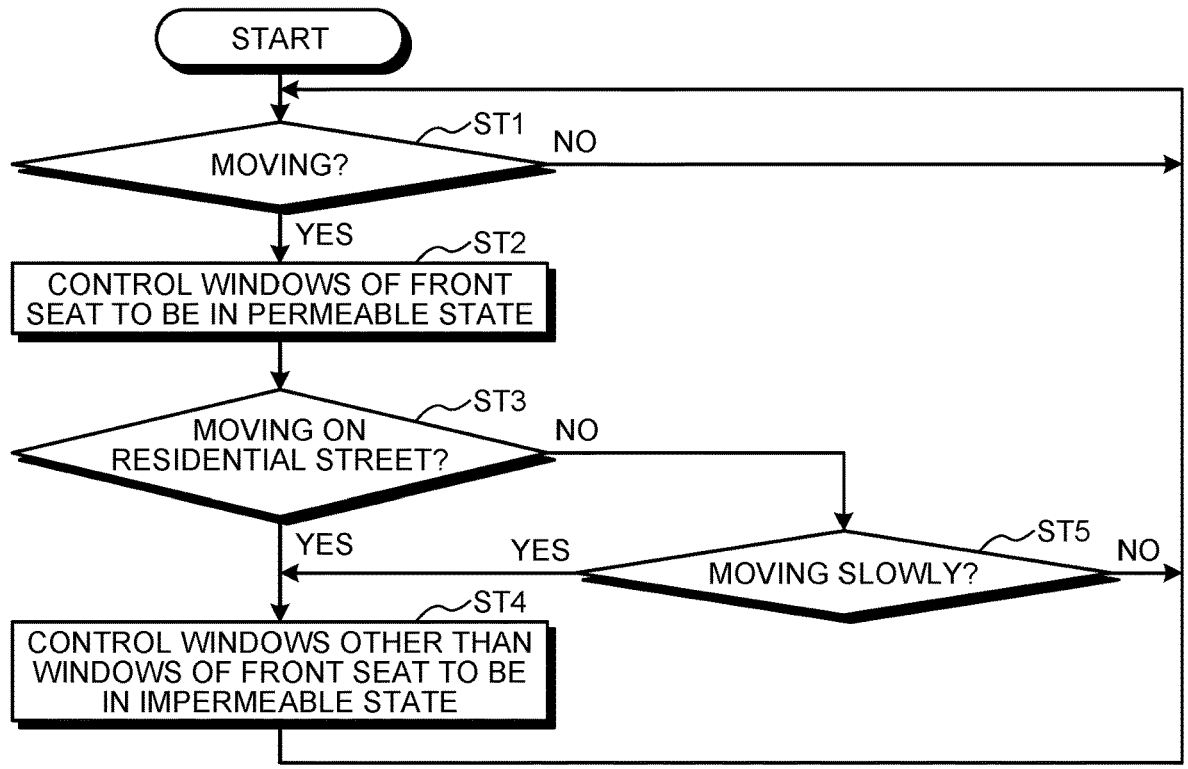
FIG. 2 is a flowchart illustrating an example of control.

The flowchart in FIG. 2 illustrates a control operation performed on the windows W while the vehicle is moving. In the vehicle dimmer control system 1 of this example, the control is brought into a standby state when an accessory power source is turned on.

The controller 10 determines whether or not vehicle speed information serving as own vehicle state information indicates that the vehicle is moving (Step ST1). For example, in this Step ST1, it is determined whether or not the own vehicle is moving forward, by also performing determination as to whether or not shift position information of the transmission serving as own vehicle state information indicates a shift position "D" of a forward driving position or the like, together with determination that is based on vehicle speed information.

In a case where the vehicle speed information does not indicate that the vehicle is moving (in other words, indicate that the vehicle is at a stop), the controller 10 repeats this Step ST1 until the accessory power source is turned off. On the other hand, in a case where the vehicle speed information indicates that the vehicle is moving, the controller 10 controls visible light transmissivity of dimming glass of all the windows Wf of the front seat to be in the permeable state (Step ST2). At this time, if all the windows Wf of the front seat serving as control target windows are already in the permeable state, the controller 10 maintains the state, and if all the windows Wf of the front seat serving as control target windows are in the impermeable state, the controller 10 controls visible light transmissivity of dimming glass of all the windows Wf of the front seat to be in the permeable state.

Subsequently, the controller 10 determines whether or not own vehicle position information indicates that the vehicle is moving on a residential street (Step ST3). The determination is performed by receiving, from the car navigation system, for example, information such as map information and information indicating whether or not a current zone is a zone corresponding to a so-called zone 30, together with own vehicle position information.

In a case where own vehicle position information indicates that the vehicle is moving on a residential street, the controller 10 determines all the remaining windows W (windows Wr on the rear seat side, etc.) other than all the windows Wr of the front seat to be control target windows, and if the control target windows are in the permeable state, the controller 10 controls visible light transmissivity of dimming glass of the control target windows to be in the impermeable state (Step ST4). At this time, if the control target windows are already in the impermeable state, the controller 10 maintains the state. After the controller 10 ends the control, the processing returns to Step ST1.

In this manner, on the residential street where vehicle speed is low and a pedestrian is highly likely to exist near the own vehicle, the vehicle dimmer control system 1 controls all the remaining windows W other than all the windows Wr of the front seat to be in the impermeable state. Thus, because the inside of the vehicle compartment becomes less-visible from the vehicle exterior while the vehicle is moving on the residential street, the vehicle dimmer control system 1 can protect the privacy of an occupant on the rear seat.

In addition, in a case where it is determined in Step ST3 that own vehicle position information does not indicate that the vehicle is moving on a residential street (in other words, in a case where the vehicle is moving in a location other than a residential street), the controller 10 determines whether or not vehicle speed information serving as own vehicle state information indicates that the vehicle is slowly moving at a speed equal to or lower than a predetermined vehicle speed (Step ST5).

In a case where vehicle speed information indicates that the vehicle is slowly moving at a speed equal to or lower than a predetermined vehicle speed, the controller 10 advances the processing to Step ST4, in which the controller 10 determines all the remaining windows W (windows Wr on the rear seat side, etc.) other than all the windows Wr of the front seat to be control target windows, and if the control target windows are in the permeable state, the controller 10 controls visible light transmissivity of dimming glass of the control target windows to be in the impermeable state. At this time, if the control target windows are already in the impermeable state, the controller 10 maintains the state. After the controller 10 ends the control, the processing returns to Step ST1.

In this manner, the vehicle dimmer control system 1 controls all the remaining windows W other than all the windows Wr of the front seat to be in the impermeable state while the vehicle is moving slowly. Thus, because the inside of the vehicle compartment becomes less-visible from the vehicle exterior while the vehicle is moving slowly, the vehicle dimmer control system 1 can protect the privacy of an occupant on the rear seat.

In addition, in a case where vehicle speed information does not indicate that the vehicle is slowly moving at a speed equal to or lower than a predetermined vehicle speed (in other words, in a case where the vehicle is moving at a vehicle speed exceeding the slow speed, in a location other than the residential street), the controller 10 returns the processing to Step ST1. Note that, in this case, the controller 10 may execute control illustrated in the next flowchart in FIG. 3.

Note that, in the control exemplified here, while the vehicle is moving, all the windows Wr of the front seat are controlled to be in the permeable state, and when the vehicle is moving on a residential street or when the vehicle is moving slowly, all the remaining windows W other than all the windows Wr of the front seat are controlled to be in the impermeable state. Nevertheless, for example, in a case where the example is applied to the vehicle C that can perform completely-automated driving, which will be described later, the controller 10 may be caused to control all the windows W of the vehicle C to be in the impermeable state, when the vehicle is moving on a residential street or when the vehicle is moving slowly.

Example 2

Figure 3:
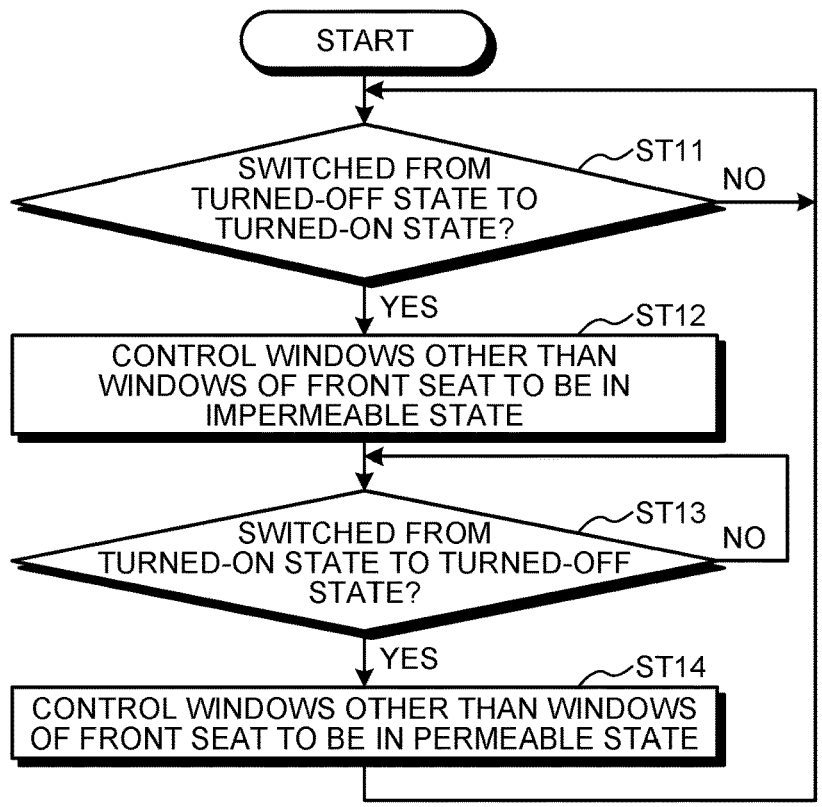
FIG. 3 is a flowchart illustrating an example of control.

The flowchart in FIG. 3 illustrates a control operation performed on the windows W in accordance with the state of a vehicle interior illumination device L. The vehicle interior illumination device L is an illumination device installed inside the vehicle compartment, and is an illumination device that can be turned on and off by an occupant. For example, the vehicle interior illumination device L is a room lamp, a map lamp, a reading lamp, a vanity lamp, a personal lamp, or the like. In the vehicle C, when the vehicle interior illumination device L is turned on, vehicle interior illumination device information indicating the turned-on state is transmitted to the controller 10, and when the vehicle interior illumination device L is turned off, vehicle interior illumination device information indicating the turned-off state is transmitted to the controller 10. In addition, in the vehicle C, also when a door D is opened or closed, the vehicle interior illumination device L (for example, room lamp) is turned on or turned off. Thus, vehicle interior illumination device information indicating the turned-on state or the turned-off state is transmitted to the controller 10.

The control may be executed while the vehicle is moving or may be executed while the vehicle is at a stop. In addition, in the vehicle dimmer control system 1, the control may be brought into a standby state when an accessory power source is turned on, or the control may be brought into a standby state in accordance with a start command from an occupant inside the vehicle compartment. In this example, by an occupant starting a switch provided inside the vehicle compartment, such as a center console or an instrument panel, a start command of the control is transmitted to the controller 10, and the control is brought into a standby state. On the other hand, when an occupant ends the switch, an end command of the control is transmitted to the controller 10, and the control is ended.

In the standby state, the controller 10 determines whether or not vehicle interior illumination device information serving as own vehicle state information has switched from the turned-off state to the turned-on state (Step ST11).

In a case where vehicle interior illumination device information has not switched from the turned-off state to the turned-on state, the controller 10 repeats Step ST11 until the control is ended in accordance with an end command from an occupant inside the vehicle compartment. Then, in a case where vehicle interior illumination device information has switched from the turned-off state to the turned-on state, the controller 10 determines all the remaining windows W (windows Wr on the rear seat side, etc.) other than all the windows Wf of the front seat to be control target windows, and if the control target windows are in the permeable state, the controller 10 controls visible light transmissivity of dimming glass of the control target windows to be in the impermeable state (Step ST12). At this time, if the control target windows are already in the impermeable state, the controller 10 maintains the state.

In this manner, the vehicle dimmer control system 1 controls all the remaining windows W other than all the windows Wr of the front seat to be in the impermeable state, when the vehicle interior illumination device L is turned on. Thus, because the inside of the vehicle compartment becomes less-visible from the vehicle exterior even if the inside of the vehicle compartment becomes brighter than the vehicle exterior due to lighting of the vehicle interior illumination device L during nighttime or inside a tunnel, for example, the vehicle dimmer control system 1 can protect the privacy of an occupant on the rear seat.

Figure 4:
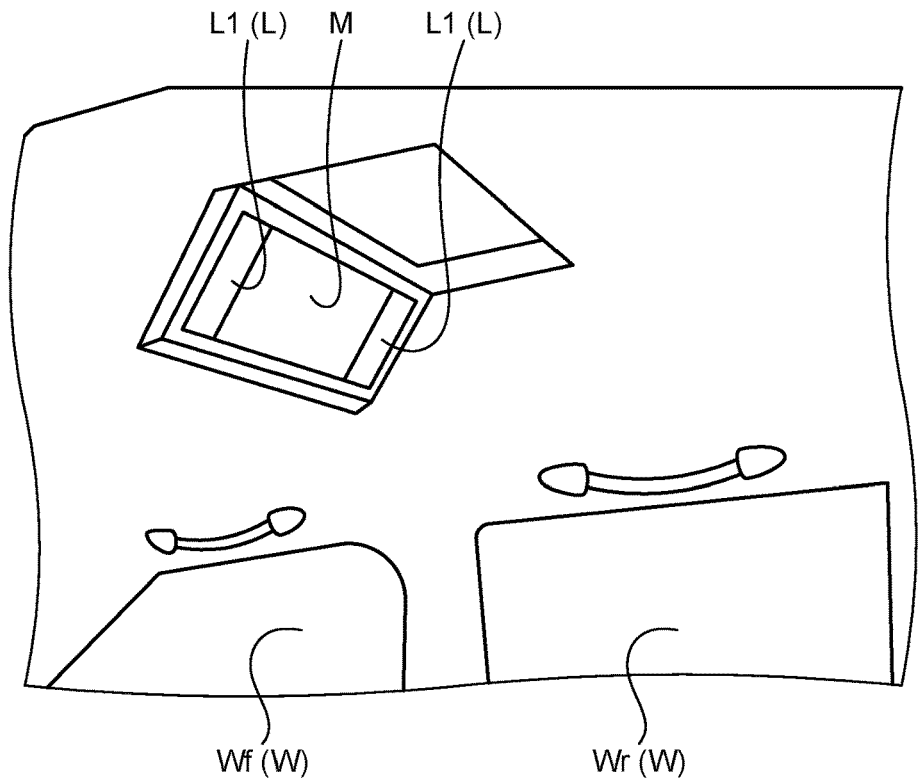
FIG. 4 is a diagram describing a function and an effect related to a vanity lamp.

Furthermore, in a case where the turned-on vehicle interior illumination device L is a vanity lamp L1, a vanity mirror M is provided near the vanity lamp L1 (FIG. 4). For example, the vehicle dimmer control system 1 controls all the remaining windows W other than all the windows Wr of the front seat to be in the impermeable state, when the vanity lamp L1 on the rear seat side is turned on. With this configuration, even in a situation in which outside light enters the vanity mirror M, during daytime or the like, the vehicle dimmer control system 1 can prevent outside light from entering the vanity mirror M. Thus, a mirror plane of the vanity mirror M can be moderately illuminated by the vanity lamp L1. Thus, the vehicle dimmer control system 1 can enhance visibility of information shown on the mirror plane of the vanity mirror M. Note that, if all the windows Wr of the front seat are controlled to be in the impermeable state in accordance with lighting of a vanity lamp on the front seat side, the vehicle dimmer control system 1 can enhance visibility of information shown on the mirror plane of a vanity mirror provided near the vanity lamp on the front seat side.

Note that, depending on the type or a mounted position of the vehicle interior illumination device L, all the remaining windows W other than all the windows Wr of the front seat sometimes include a window W from which light of the light source does not leak to the vehicle exterior. In such a case, the inside of the vehicle compartment becomes less likely to be visible from the vehicle exterior via the window W. Thus, in this Step ST12, the controller 10 may control windows excluding such a window W from all the remaining windows W other than all the windows Wr of the front seat, to be in the impermeable state.

The controller 10 illustrated here subsequently determines whether or not vehicle interior illumination device information serving as own vehicle state information has switched from the turned-on state to the turned-off state (Step ST13).

In a case where vehicle interior illumination device information has not switched from the turned-on state to the turned-off state, the controller 10 repeats Step ST13 until the control is ended in accordance with an end command from an occupant inside the vehicle compartment. Note that, when the controller 10 receives an end command during the repetition, it is sufficient that the processing proceeds to Step ST14, for example, and the controller 10 determines all the remaining windows W (windows Wr on the rear seat side, etc.) other than all the windows Wf of the front seat to be control target windows, and controls visible light transmissivity of dimming glass of the control target windows to be in the permeable state. In other words, when the controller 10 receives an end command, the controller 10 may return all the remaining windows W (windows Wr on the rear seat side, etc.) other than all the windows Wf of the front seat to a state (permeable state) before the start of the control.

On the other hand, in a case where vehicle interior illumination device information has switched from the turned-on state to the turned-off state, the controller 10 determines all the remaining windows W (windows Wr on the rear seat side, etc.) other than all the windows Wf of the front seat to be control target windows, and controls visible light transmissivity of dimming glass of the control target windows to be in the permeable state (Step ST14). After that, the controller 10 returns the control to the standby state, and returns the processing to Step ST11.

Here, in the vehicle dimmer control system 1, there is a possibility that all the remaining windows W (windows Wr on the rear seat side, etc.) other than all the windows Wf of the front seat are controlled to be in the impermeable state by another control before the start of the control. In such a case, when the control is ended in accordance with an end command from an occupant inside the vehicle compartment, the controller 10 needs not always return all the remaining windows W (windows Wr on the rear seat side, etc.) other than all the windows Wf of the front seat to the state before the start of the control. For example, the controller 10 is only required to determine priority between the control and another control. Then, in a case where priority of the control is higher than that of another control, when the control is ended in accordance with an end command from an occupant inside the vehicle compartment, the controller 10 is caused to control visible light transmissivity of dimming glass of all the remaining windows W (windows Wr on the rear seat side, etc.) other than all the windows Wf of the front seat to be in the permeable state. On the other hand, in a case where priority of the control is lower than that of another control, when the control is ended in accordance with an end command from an occupant inside the vehicle compartment, the controller 10 is caused to maintain all the remaining windows W (windows Wr on the rear seat side, etc.) other than all the windows Wf of the front seat in the impermeable state.

Note that, in a case where all the windows Wr of the front seat may be brought into the impermeable state while the vehicle is moving, in Step ST12, the controller 10 may be caused to determine all the windows Wr of the front seat to be control target windows as well, and control visible light transmissivity of dimming glass of all the windows Wr of the front seat to be in the impermeable state. Then, when the controller 10 in this case receives an end command during the repetition of Step ST13, the controller 10 may be caused to determine all the windows Wr of the front seat to be control target windows as well, and control visible light transmissivity of dimming glass of all the windows Wr of the front seat to be in the permeable state. In addition, in Step ST14, the controller 10 in this case may be caused to determine all the windows Wr of the front seat to be control target windows as well, and control visible light transmissivity of dimming glass of all the windows Wr of the front seat to be in the permeable state.

Example 3

Figure 5:
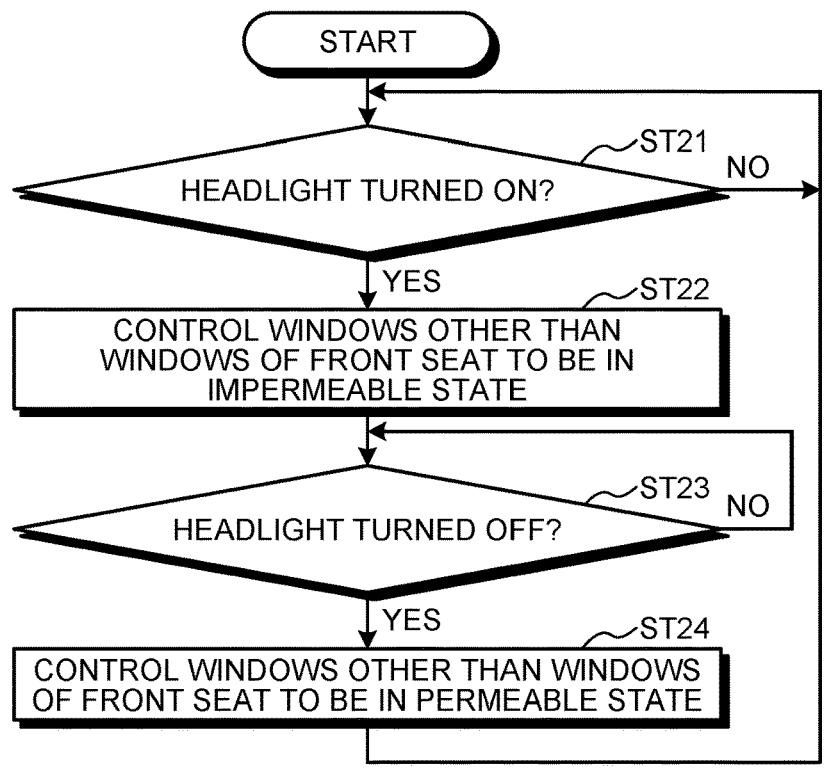
FIG. 5 is a flowchart illustrating an example of control.

In the example 2, the vehicle interior illumination device L is highly likely to be turned on in a situation in which the vehicle exterior darkens, such as nighttime, inside of a tunnel, or rainfall under a cloudy condition, for example. The flowchart in FIG. 5 illustrates a control operation performed on the windows W in such a situation. The control is executed based on headlight information indicating whether or not a headlight HL is turned on. For example, the vehicle C is equipped with a so-called auto light device that automatically turns on the headlight HL when the vehicle exterior darkens. Thus, in this vehicle C, it may be determined that the vehicle exterior darkens, when the auto light device turns on the headlight HL. Thus, in the control, turned-on information and turned-off information of the headlight HL in the auto light device are used as headlight information. In addition, in this vehicle C, it can also be determined that the vehicle exterior darkens, when an occupant manually turns on the headlight HL. Thus, in the control, turned-on information and turned-off information of the headlight HL that are obtained in accordance with a manual operation of an occupant are also used as headlight information. Note that, in the control, turned-on information of a so-called daytime running light is not used for determination as to whether or not the vehicle exterior darkens.

The controller 10 determines whether or not headlight information serving as own vehicle state information indicates that the headlight HL is turned on (Step ST21).

In a case where headlight information does not indicate that the headlight HL is turned on, the controller 10 estimates that the vehicle exterior does not darken, and repeats Step ST21. On the other hand, in a case where headlight information indicates that the headlight HL is turned on, the controller 10 estimates that the vehicle exterior darkens, and determines all the remaining windows W (windows Wr on the rear seat side, etc.) other than all the windows Wf of the front seat to be control target windows, and if the control target windows are in the permeable state, the controller 10 controls visible light transmissivity of dimming glass of the control target windows to be in the impermeable state (Step ST22). At this time, if the control target windows are already in the impermeable state, the controller 10 maintains the state.

In this manner, the vehicle dimmer control system 1 controls all the remaining windows W other than all the windows Wr of the front seat to be in the impermeable state, when it is estimated that the vehicle exterior darkens. Thus, because the inside of the vehicle compartment becomes less-visible from the vehicle exterior even if the inside of the vehicle compartment becomes brighter than the vehicle exterior by an occupant turning on the vehicle interior illumination device L during nighttime or inside a tunnel, for example, the vehicle dimmer control system 1 can protect the privacy of an occupant on the rear seat.

Subsequently, the controller 10 determines whether or not headlight information serving as own vehicle state information indicates that the headlight HL is turned off (Step ST23).

In a case where headlight information does not indicate that the headlight HL is turned off (in other words, in a case where the headlight HL is continuously turned on), the controller 10 repeats Step ST23. On the other hand, in a case where headlight information indicates that the headlight HL is turned off (in other words, in a case where the turned-on headlight HL is turned off), the controller 10 determines all the remaining windows W (windows Wr on the rear seat side, etc.) other than all the windows Wf of the front seat to be control target windows, and controls visible light transmissivity of dimming glass of the control target windows to be in the permeable state (Step ST24). With this configuration, the vehicle dimmer control system 1 can return the window W brought into the impermeable state in tandem with the headlight HL of the vehicle C that is turned on when the vehicle C enters a tunnel during daytime on a sunny day, for example, to the permeable state after the vehicle C goes out of the tunnel. After that, the controller 10 returns the processing to Step ST21.

Here, the determination of priority described in Example 2 may be applied to the control of this example 3.

Note that, in a case where all the windows Wr of the front seat may be brought into the impermeable state while the vehicle is moving, in Step ST22, the controller 10 may be caused to determine all the windows Wr of the front seat to be control target windows as well, and control visible light transmissivity of dimming glass of all the windows Wr of the front seat to be in the impermeable state. Then, in Step ST24, the controller 10 in this case may be caused to determine all the windows Wr of the front seat to be control target windows as well, and control visible light transmissivity of dimming glass of all the windows Wr of the front seat to be in the permeable state.

Example 4

Figure 6:
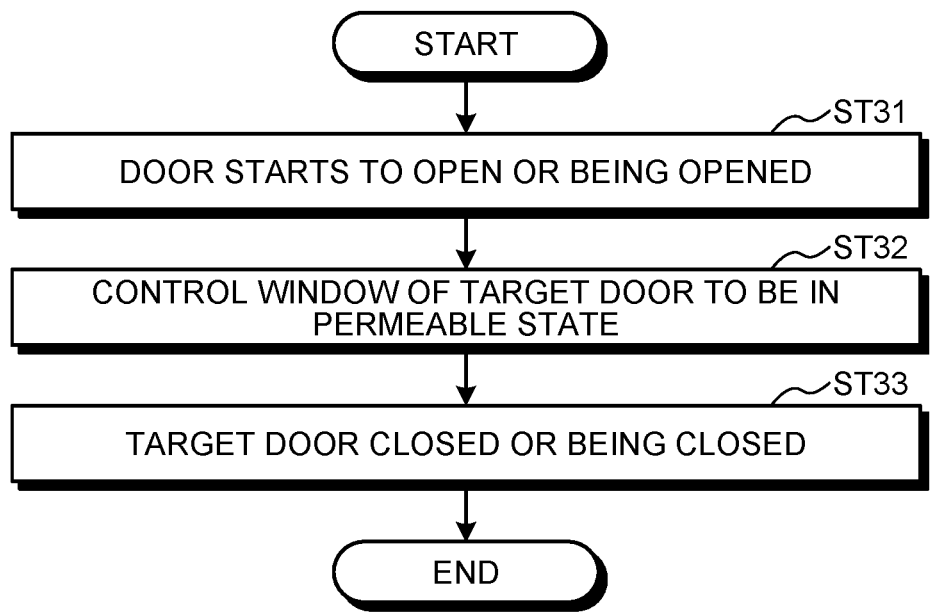
FIG. 6 is a flowchart illustrating an example of control.

Meanwhile, an occupant sometimes considers that the situation of the vehicle exterior is desired to be clearly identified from the inside of the vehicle compartment while the vehicle is at a stop, when the occupant goes out of the vehicle, or the like for example. The flowchart in FIG. 6 illustrates a control operation performed on the window W of the door D for identifying the situation. Note that the door D serving as a target of the control is an occupant unloading door.

The control is started when an accessory power source is turned on, and is brought into a standby state. In the standby state, in a case where at least one of all the doors D starts to open, or in a case where at least one of all the doors D is being opened (Step ST31), the controller 10 illustrated here performs control as follows being triggered by this.

Whether or not the door D starts to open can be determined by determining whether or not door open/close information serving as own vehicle state information indicates an open operation. The door open/close information is information obtained based on a detection signal of a detection sensor (not illustrated) that detects an opened/closed state of the door D, for example. When the closed door D starts to open, because a change of the door D from a closed state to an opened state is detected based on a detection signal of the detection sensor, based on the detection information, it can be seen that door open/close operation information indicates an open operation. On the other hand, when the opened door D is closed, because a change of the door D from the opened state to the closed state is detected based on a detection signal of the detection sensor, based on the detection information, it can be seen that door open/close information indicates the closed state.

In addition, whether or not the door D is being opened can be determined by determining whether or not door open/close command information serving as own vehicle state information indicates an open command. In the case of an electric slide door in which the door D is opened or closed using the drive force of a rotary machine, for example, the door open/close command information refers to an open command transmitted to the rotary machine by an open command operation performed by an occupant when the door D is opened, and refers to a close command transmitted to the rotary machine by a close command operation performed by an occupant when the door D is closed.

In a case where door open/close information of at least one of all the doors D indicates an open operation (in a case where at least one of all the doors D starts to open) or in a case where door open/close command information of at least one of all the doors D indicates an open command (in a case where at least one of all the doors D is being opened), the controller 10 determines the window W of the door D corresponding to the open operation or the open command, to be a control target window, and if the control target window is in the impermeable state, controls visible light transmissivity of dimming glass of the control target window to be in the permeable state (Step ST32).

In this manner, when the door D starts to open or the door D is being opened, even if the window W of the door D is in the impermeable state for privacy protection, the vehicle dimmer control system 1 controls the window W to be in the permeable state. Thus, because it is possible to clearly identify the situation of the vehicle exterior from the window W, the vehicle dimmer control system 1 can ensure safety of an occupant when the occupant goes out of the vehicle, for example.

Subsequently, in a case where door open/close information of the door D serving as a target of control in Step ST32 indicates the closed state (in other words, in a case where the door D is closed), or in a case where door open/close command information of the door D serving as a target of control in Step ST32 indicates a closed command (in other words, in a case where the door D is being closed), the controller 10 controls visible light transmissivity of dimming glass of the window W of the door D to be in the impermeable state, being triggered by this (Step ST33).

In this manner, when the door D serving as a target of control in Step ST32 is closed or when the door D serving as a target of control in Step ST32 is being closed, the vehicle dimmer control system 1 controls the window W of the door D to be in the impermeable state. Thus, the vehicle dimmer control system 1 can protect the privacy of an occupant staying inside the vehicle compartment or an occupant who has got into the vehicle from the door D, for example.

Example 5

Figure 7:
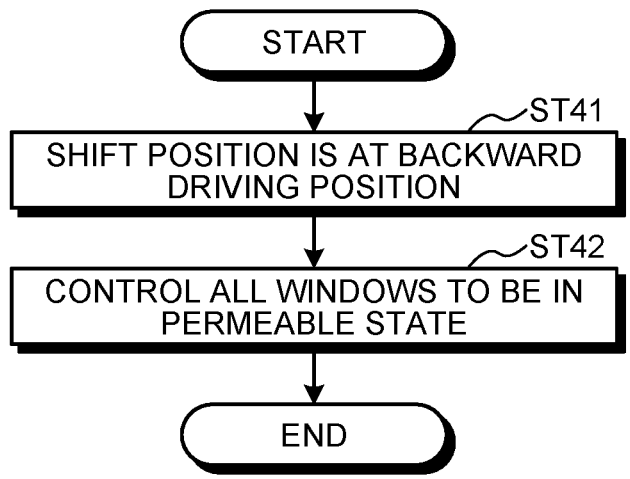
FIG. 7 is a flowchart illustrating an example of control.

When moving the vehicle C backward for putting the vehicle C into a garage, or the like, a driver desires to ensure visibility all around the own vehicle. The flowchart in FIG. 7 illustrates a control operation performed on the windows W when the vehicle is moving backward.

The control is started when an accessory power source is turned on, and is brought into a standby state. In the standby state, in a case where shift position information of the transmission serving as own vehicle state information indicates a shift position of a backward driving position (Step ST41), the controller 10 illustrated here performs control as follows being triggered by this. In this case, irrespective whether all the windows W are in the permeable state or the impermeable state, the controller 10 controls visible light transmissivity of dimming glass of all the windows W to be in the permeable state (Step ST42).

With this configuration, the vehicle dimmer control system 1 can provide a driver with safety when the vehicle C is moved backward.

Example 6

In recent years, in the vehicle C such as an automobile, it becomes possible to perform various remote operations from the vehicle exterior using a communication device. For example, the vehicle C can be remotely operated from the vehicle exterior while the vehicle C is parked, air conditioning inside the vehicle compartment can be remotely operated from the vehicle exterior while the vehicle C is parked, and the vehicle C can be monitored from the vehicle exterior while the vehicle C is parked. Thus, as compared with conventional vehicles, large capacity power can be supplied to the vehicle C of recent years even when the vehicle C is being parked and an accessory power source is turned off. On the other hand, in the vehicle C, various protective plans such as countermeasures for pranks played while the vehicle C is parked are demanded. Making the inside of the vehicle compartment or the inside of a boot less-visible from the vehicle exterior while the vehicle C is parked is one of the protective plans. The flowchart in FIG. 8 illustrates a control operation performed on the windows W that is expected to contribute to the protective plans.

For example, in a case where shift position information of the transmission serving as own vehicle state information indicates a shift position of a parking position (Step ST51), the controller 10 controls visible light transmissivity of dimming glass of all the windows W to be in the impermeable state (Step ST52).

With this configuration, when an occupant stays inside the vehicle compartment while the vehicle is parked, for example, the vehicle dimmer control system 1 can protect the privacy of the occupant. In addition, because it is possible to make the situation of the inside of the vehicle compartment or the inside of a boot less identifiable from the vehicle exterior, when no occupant stays inside the vehicle compartment while the vehicle is parked, for example, the vehicle dimmer control system 1 is useful also for anticrime measures.

Example 7

Meanwhile, in recent years, the development of a vehicle (vehicle that can perform so-called completely-automated driving) C including an automatic driving mode in which all operations related to vehicle driving are entrusted to the vehicle side has been promoted. If the vehicle C is of this type, in a case where own vehicle state information indicates that the vehicle C is in such an automatic driving mode, the controller 10 may be caused to control visible light transmissivity of dimming glass of all the windows W to be in the impermeable state. With this configuration, the vehicle dimmer control system 1 can protect the privacy of an occupant in any cases.

As described above, the vehicle dimmer control system 1 according to the present embodiment controls the window W including dimming glass changed in visible light transmissivity using an electrical signal, to be in the permeable state or the impermeable state, based on dimming determination information corresponding to the above-described various conditions. Thus, the vehicle dimmer control system 1 can make privacy protection of the inside of the vehicle compartment prompt.

The vehicle dimmer control system according to the present embodiment controls a window including dimming glass changed in visible light transmissivity using an electrical signal, to a permeable state or an impermeable state, based on dimming determination information. Thus, the vehicle dimmer control system can make privacy protection of the inside of the vehicle compartment prompt.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A vehicle dimmer control system comprising:
a controller operatively connected to a plurality of windows of a vehicle that change visible light transmissivity based on an electrical signal, the controller configured to control visible light transmissivity of dimming glass for each of the windows, based on dimming determination information of a vehicle for determining whether to bring the windows disposed at a plurality of points of the vehicle into a permeable state or an impermeable state, wherein
the dimming determination information is own vehicle state information indicating a state of an own vehicle, and own vehicle position information indicating an own vehicle position, and
the controller determines a control target window to be changed in visible light transmissivity, from among the plurality of windows based on the dimming determination information, and controls visible light transmissivity of dimming glass of the control target window to be in the permeable state or the impermeable state,
in a case where the own vehicle position information indicates that the vehicle is moving on a residential street, the controller determines remaining windows other than all windows of the front seat to be the control target windows, and the controller controls visible light transmissivity of dimming glass of the control target windows to be in the impermeable state.

2. The vehicle dimmer control system according to claim 1, wherein
in a case where vehicle speed information serving as the own vehicle state information indicates that the vehicle is moving, the controller controls visible light transmissivity of dimming glass of all the windows of a front seat to be in the permeable state.

3. The vehicle dimmer control system according to claim 1, wherein
in a case where vehicle speed information serving as the own vehicle state information indicates that the vehicle is slowly moving at a speed equal to or lower than a predetermined vehicle speed, the controller determines all the remaining windows other than all the windows of the front seat to be the control target windows, and if the control target windows are in the permeable state, the controller controls visible light transmissivity of dimming glass of the control target windows to be in the impermeable state.

4. The vehicle dimmer control system according to claim 2, wherein
in a case where vehicle speed information serving as the own vehicle state information indicates that the vehicle is slowly moving at a speed equal to or lower than a predetermined vehicle speed, the controller determines all the remaining windows other than all the windows of the front seat to be the control target windows, and if the control target windows are in the permeable state, the controller controls visible light transmissivity of dimming glass of the control target windows to be in the impermeable state.

5. The vehicle dimmer control system according to claim 1, wherein
in a case where vehicle interior illumination device information serving as the own vehicle state information has switched from a turned-off state to a turned-on state, the controller determines all the remaining windows other than all the windows of the front seat to be the control target windows, and if the control target windows are in the permeable state, the controller controls visible light transmissivity of dimming glass of the control target windows to be in the impermeable state, and
in a case where vehicle interior illumination device information serving as the own vehicle state information has switched from the turned-on state to the turned-off state, the controller determines all the remaining windows other than all the windows of the front seat to be the control target windows, and controls visible light transmissivity of dimming glass of the control target windows to be in the permeable state.

6. The vehicle dimmer control system according to claim 2, wherein
in a case where vehicle interior illumination device information serving as the own vehicle state information has switched from a turned-off state to a turned-on state, the controller determines all the remaining windows other than all the windows of the front seat to be the control target windows, and if the control target windows are in the permeable state, the controller controls visible light transmissivity of dimming glass of the control target windows to be in the impermeable state, and in a case where vehicle interior illumination device information serving as the own vehicle state information has switched from the turned-on state to the turned-off state, the controller determines all the remaining windows other than all the windows of the front seat to be the control target windows, and controls visible light transmissivity of dimming glass of the control target windows to be in the permeable state.

7. The vehicle dimmer control system according to claim 1, wherein in a case where headlight information serving as the own vehicle state information indicates a turned-on state, the controller determines all the remaining windows other than all the windows of the front seat to be the control target windows, and if the control target windows are in the permeable state, the controller controls visible light transmissivity of dimming glass of the control target windows to be in the impermeable state, and in a case where headlight information serving as the own vehicle state information indicates a turned-off state after the control, the controller determines all the remaining windows other than all the windows of the front seat to be the control target windows, and controls visible light transmissivity of dimming glass of the control target windows to be in the permeable state.

8. The vehicle dimmer control system according to claim 2, wherein in a case where headlight information serving as the own vehicle state information indicates a turned-on state, the controller determines all the remaining windows other than all the windows of the front seat to be the control target windows, and if the control target windows are in the permeable state, the controller controls visible light transmissivity of dimming glass of the control target windows to be in the impermeable state, and in a case where headlight information serving as the own vehicle state information indicates a turned-off state after the control, the controller determines all the remaining windows other than all the windows of the front seat to be the control target windows, and controls visible light transmissivity of dimming glass of the control target windows to be in the permeable state.

9. The vehicle dimmer control system according to claim 1, wherein in a case where door open/close information serving as the own vehicle state information of at least one of all doors indicates an open operation, or in a case where door open/close command information serving as the own vehicle state information of at least one of all doors indicates an open command, the controller determines a window of a door corresponding to the open operation or the open command to be the control target window, and if the control target window is in the impermeable state, the controller controls visible light transmissivity of dimming glass of the control target window to be in the permeable state, and in a case where the door open/close information of a door serving as a target of the control indicates a closed state, or in a case where the door open/close command information of a door serving as a target of the control indicates a close command, the controller controls visible light transmissivity of dimming glass of a window of a door corresponding to the closed state or the closed command to be in the impermeable state.

10. The vehicle dimmer control system according to claim 1, wherein in a case where shift position information of a transmission serving as the own vehicle state information indicates a shift position of a backward driving position, the controller controls visible light transmissivity of dimming glass of all the windows to be in the permeable state, irrespective of whether all the windows are in the permeable state or the impermeable state.

11. The vehicle dimmer control system according to claim 2, wherein in a case where shift position information of a transmission serving as the own vehicle state information indicates a shift position of a backward driving position, the controller controls visible light transmissivity of dimming glass of all the windows to be in the permeable state, irrespective of whether all the windows are in the permeable state or the impermeable state.

12. The vehicle dimmer control system according to claim 3, wherein in a case where shift position information of a transmission serving as the own vehicle state information indicates a shift position of a backward driving position, the controller controls visible light transmissivity of dimming glass of all the windows to be in the permeable state, irrespective of whether all the windows are in the permeable state or the impermeable state.

13. The vehicle dimmer control system according to claim 1, wherein in a case where shift position information of a transmission serving as the own vehicle state information indicates a shift position of a parking position, the controller controls visible light transmissivity of dimming glass of all the windows to be in the impermeable state.

14. The vehicle dimmer control system according to claim 2, wherein in a case where shift position information of a transmission serving as the own vehicle state information indicates a shift position of a parking position, the controller controls visible light transmissivity of dimming glass of all the windows to be in the impermeable state.

15. The vehicle dimmer control system according to claim 3, wherein in a case where shift position information of a transmission serving as the own vehicle state information indicates a shift position of a parking position, the controller controls visible light transmissivity of dimming glass of all the windows to be in the impermeable state.

16. A vehicle dimmer control system comprising:

a controller operatively connected to a plurality of windows of a vehicle that change visible light transmissivity based on an electrical signal, the controller configured to control visible light transmissivity of dimming glass for each of the windows, based on dimming determination information of a vehicle for determining whether to bring the windows disposed at a plurality of points of the vehicle into a permeable state or an impermeable state, wherein the dimming determination information is own vehicle state information indicating a state of an own vehicle, and own vehicle position information indicating an own vehicle position, and the controller determines a control target window to be changed in visible light transmissivity, from among the plurality of windows based on the dimming determination information, and controls visible light transmissivity of dimming glass of the control target window to be in the permeable state or the impermeable state, in a case where vehicle speed information serving as the own vehicle state information indicates that the vehicle is slowly moving at a speed equal to or lower than a predetermined vehicle speed, the controller determines all the remaining windows other than all the windows of the front seat to be the control target windows, and if the control target windows are in the permeable state, the controller controls visible light transmissivity of dimming glass of the control target windows to be in the impermeable state.

* * * * *